(12) United States Patent
Iwasaki et al.

(10) Patent No.: US 7,722,200 B2
(45) Date of Patent: May 25, 2010

(54) ELECTRIC MIRROR CONTROL DEVICE

(75) Inventors: Hiromi Iwasaki, Fujieda (JP); Ayako Yamada, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 0 days.

(21) Appl. No.: 12/352,264

(22) Filed: Jan. 12, 2009

(65) Prior Publication Data

US 2009/0122433 A1    May 14, 2009

Related U.S. Application Data

(63) Continuation of application No. 11/447,108, filed on Jun. 6, 2006, now abandoned.

(30) Foreign Application Priority Data

Aug. 1, 2005    (JP) ............................. 2005-223331

(51) Int. Cl.
*G02B 7/182* (2006.01)
*B60R 1/06* (2006.01)

(52) U.S. Cl. .................. 359/843; 359/877; 359/900

(58) Field of Classification Search ................ 359/843, 359/877, 872, 900
See application file for complete search history.

(56) References Cited

U.S. PATENT DOCUMENTS

| | | |
|---|---|---|
| 4,770,522 A | 9/1988 | Alten |
| 4,798,967 A | 1/1989 | Yamana et al. |
| 4,936,671 A | 6/1990 | Kaspar |
| 4,981,349 A | 1/1991 | Tamiya et al. |
| 4,986,646 A | 1/1991 | Hamamoto et al. |
| 5,008,603 A | 4/1991 | Nakayama et al. |
| 5,033,835 A | 7/1991 | Platzer, Jr. |
| 5,514,940 A | 5/1996 | Okamoto |
| 5,703,732 A | 12/1997 | Boddy et al. |
| 5,811,957 A * | 9/1998 | Bose et al. .................. 318/802 |
| 5,952,802 A | 9/1999 | Pimley |
| 5,993,018 A | 11/1999 | Hattori et al. |
| 6,094,027 A | 7/2000 | Willmore et al. |
| 6,382,806 B1 | 5/2002 | Fuchs et al. |
| 7,137,717 B2 | 11/2006 | Ohashi |

FOREIGN PATENT DOCUMENTS

| | | |
|---|---|---|
| DE | 39 23 174 A1 | 2/1990 |
| EP | 1 097 845 A2 | 5/2001 |
| JP | 2003-200783 | 7/2003 |
| WO | 96/02849 A1 | 2/1996 |

* cited by examiner

*Primary Examiner*—Ricky D Shafer
(74) *Attorney, Agent, or Firm*—Oblon, Spivak, McClelland, Maier & Neustadt, L.L.P.

(57) ABSTRACT

An electric mirror control device is provided which can prevent generation of a clutch noise by stopping slipping of a clutch provided at an actuator as quickly as possible while preventing narrowing of an allowable range of a tilting angle of a mirror surface. In controlling an electric mirror, a control device clamps a voltage value of a voltage applied to a motor detected by a mirror surface angle detection circuit to a predetermined upper limit value and a predetermined lower limit value at a clamp circuit. Stop control of the motor is performed based on the voltage value clamped to the upper limit value and the lower limit value in this way.

14 Claims, 11 Drawing Sheets

ELECTRIC MIRROR CONTROL DEVICE

CROSS REFERENCE TO RELATED APPLICATIONS

The present application is a continuation of U.S. application Ser. No. 11/447,108, filed Jun. 6, 2006 now abandoned, and further is based upon and claims the benefit of priority from Japanese Patent Application No. 2005-223331, filed Aug. 1, 2005, the entire contents of each of which are hereby incorporated by reference.

BACKGROUND OF THE INVENTION

1. Field of the Invention

The present invention relates to an electric mirror control device and particularly to an electric mirror control device in which mirror surface adjustment and electric storage are carried out in an automobile electric mirror.

2. Related Background Art

As an automobile electric mirror to be mounted on an automobile, there is a type providing a mirror main body and a case for containing this mirror main body. In this type of electric mirror, the mirror main body often includes such an arrangement that a mirror surface angle is adjustable with respect to the case, and some electric mirrors are equipped with an actuator for adjusting the mirror surface angle. This type of electric mirror is arranged so that the mirror surface angle can be adjusted by driving the actuator.

In this type of electric mirror, a moving range of the mirror main body with respect to the case has an allowable range. If the mirror main body attempts to move beyond this allowable range, a clutch provided between the actuator and the mirror main body slips. Thus, by slipping of the clutch, the mirror main body is prevented from moving to a position beyond the allowable range. However, in case that the clutch is slipping, clutch noise is generated, which might give unpleasantness to a driver. Therefore, there is a problem that such a clutch noise should be eliminated or finished as soon as possible even if it is generated.

Also, in some automobile electric mirrors, use state and fold state are defined and when the electric mirror is opened with respect to a vehicle, the mirror is defined to be in use state and when closed, to be in fold state. Further, in such electric mirrors, an actuator for rotationally driving the case is provided, and positions can be switched between the use state and fold state by driving the actuator. In this type of the automobile electric mirror, the above problem of the clutch noise is also generated.

In order to cope with these problems, conventionally there is an electric mirror control device disclosed in Japanese Patent Application Laid-Open No. 2003-200783. This electric mirror control device is provided with a tilting means to tilt a mirror surface, and a control means to control tilting and stop tilting of the mirror surface by this tilting means. The control means is arranged so that an angle detecting means determines that a detected angle limit is reached when a detected angle value of the mirror surface becomes constant while the mirror surface is tilted by the tilting means.

However, with the electric mirror control device disclosed in the above Patent Document 1, it is determined that the detected angle limit is reached when a detected angle value of the mirror surface becomes constant. Here, if the detected angle value to determine that the detected angle limit is reached is set low, the determination is made that the detected angle limit is reached before reaching an allowable range, and as a result, there is a fear that the allowable range of a tilting angle of the mirror surface might be narrowed. On the other hand, if the detected angle value is set high, though the allowable range of the tilting angle is widened, excessive tilting beyond the allowable range is promoted, which brings about a problem of more frequent clutch slipping.

Thus, an object of the present invention is to provide an electric mirror control device which can stop slipping of a clutch disposed in an actuator as quickly as possible while preventing the allowable range of a tilting angle of a mirror surface from being narrowed, and can prevent generation of clutch noise.

SUMMARY OF THE INVENTION

An electric mirror control device for an automobile according to the present invention which solved the above problems includes a control method for an automobile electric mirror in which drive control of the electric mirror is performed by controlling an actuator for operating the electric mirror mounted on an automobile, comprising: a voltage sensor for detecting a voltage value applied to the actuator when the actuator is operated; a clamp means for clamping the voltage value detected by the voltage sensor at a predetermined limit value; and a stop control means for performing stop control of the actuator based on the voltage value detected by the voltage sensor and outputted through the clamp means.

In the case that an operation limit (allowable range) of an electric mirror is arranged to be detected based on a voltage value detected by a voltage sensor, the operation limit deviation is induced with high possibility due to fluctuation of the voltage in the vicinity of the operation limit. The problem of operation limit deviation can be avoided by setting the limit value high, but in this case, stop of the actuator is delayed, which promotes clutch slipping. In this respect, in the electric mirror control device according to the present invention, a clamp means is provided for clamping a voltage value detected by the voltage sensor to a predetermined limit value, and stop control of the actuator is performed based on the voltage value detected by the voltage sensor and outputted through this clamp means. Therefore, since the voltage fluctuation detected at the operation limit can be prevented, the deviation generated in the vicinity of the operation limit can be reduced. Thus, since there is no need to set the limit value high, slipping of the clutch disposed in the actuator can be stopped as quickly as possible while preventing the allowable range of the tilting angle of the mirror surface from being narrowed, and the clutch noise generation can be prevented.

As the limit value, at least one of a predetermined upper limit value or a predetermined lower limit value is defined, and a stop control means may be arranged so as to stop the actuator when the voltage value detected by the voltage sensor exceeds the predetermined upper limit value or drops below the predetermined lower limit value.

If slippage occurrence is detected when the voltage value exceeds the predetermined upper limit value or drops below the predetermined lower limit value as described above, it becomes possible to stop slipping of the clutch disposed in the actuator as quickly as possible while preventing favorably the allowable range of the tilting angle of the mirror surface from being narrowed, and thus the clutch noise generation can be prevented.

Moreover, the electric mirror may be arranged so that a case is provided with a mirror main body which is mounted thereto, a mirror surface angle is adjustable with respect to the case in the mirror main body, and the actuator drives the mirror main body so as to adjust the mirror surface angle of the mirror main body.

As described above, the actuator drive control is performed for adjusting the mirror surface angle on the occasion of adjusting the mirror surface angle of the mirror main body. In that case a problem of a slip noise occurs, but the occurrence of the slip noise can be prevented.

According to a control method of an automobile electric mirror of the present invention, slipping of a clutch disposed in an actuator can be stopped as quickly as possible, and occurrence of a clutch noise can be effectively prevented.

DESCRIPTION OF THE PREFERRED EMBODIMENTS

Figure 1:
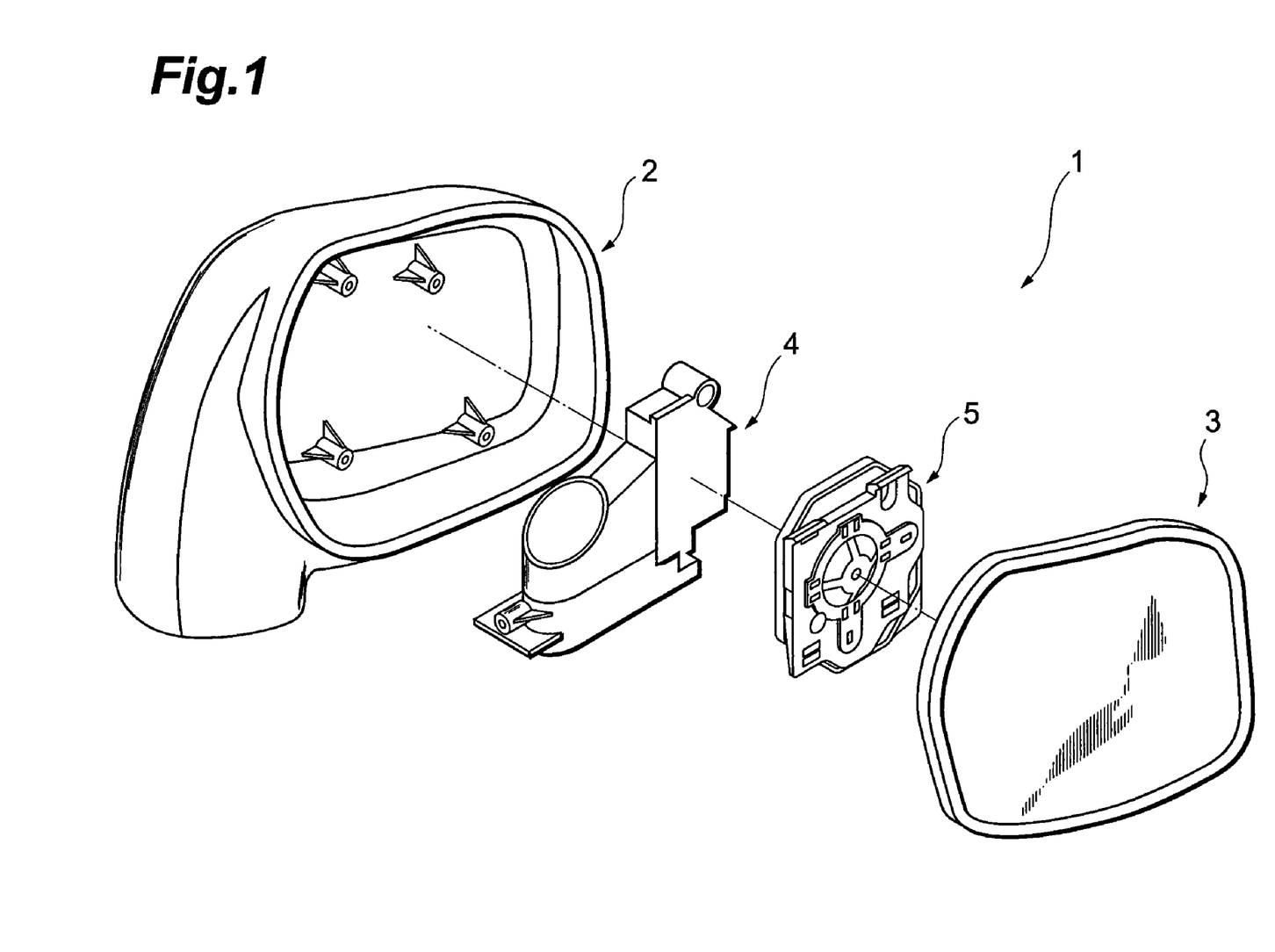
FIG. 1 is an exploded perspective view of an electric mirror used in an embodiment of the present invention.
Figure 2:
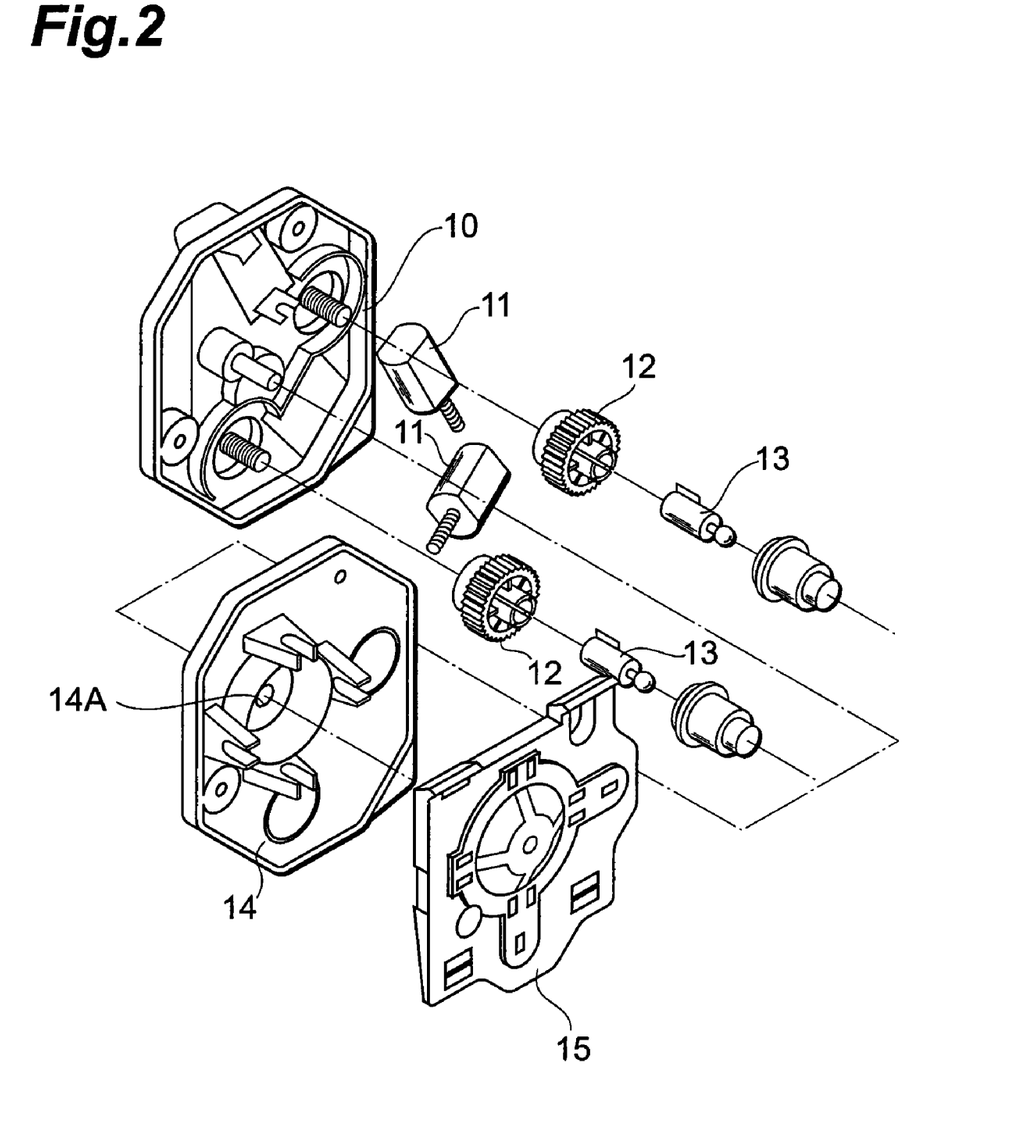
FIG. 2 is an exploded perspective view of a mirror holder and a swinging mechanism body.
Figure 3:
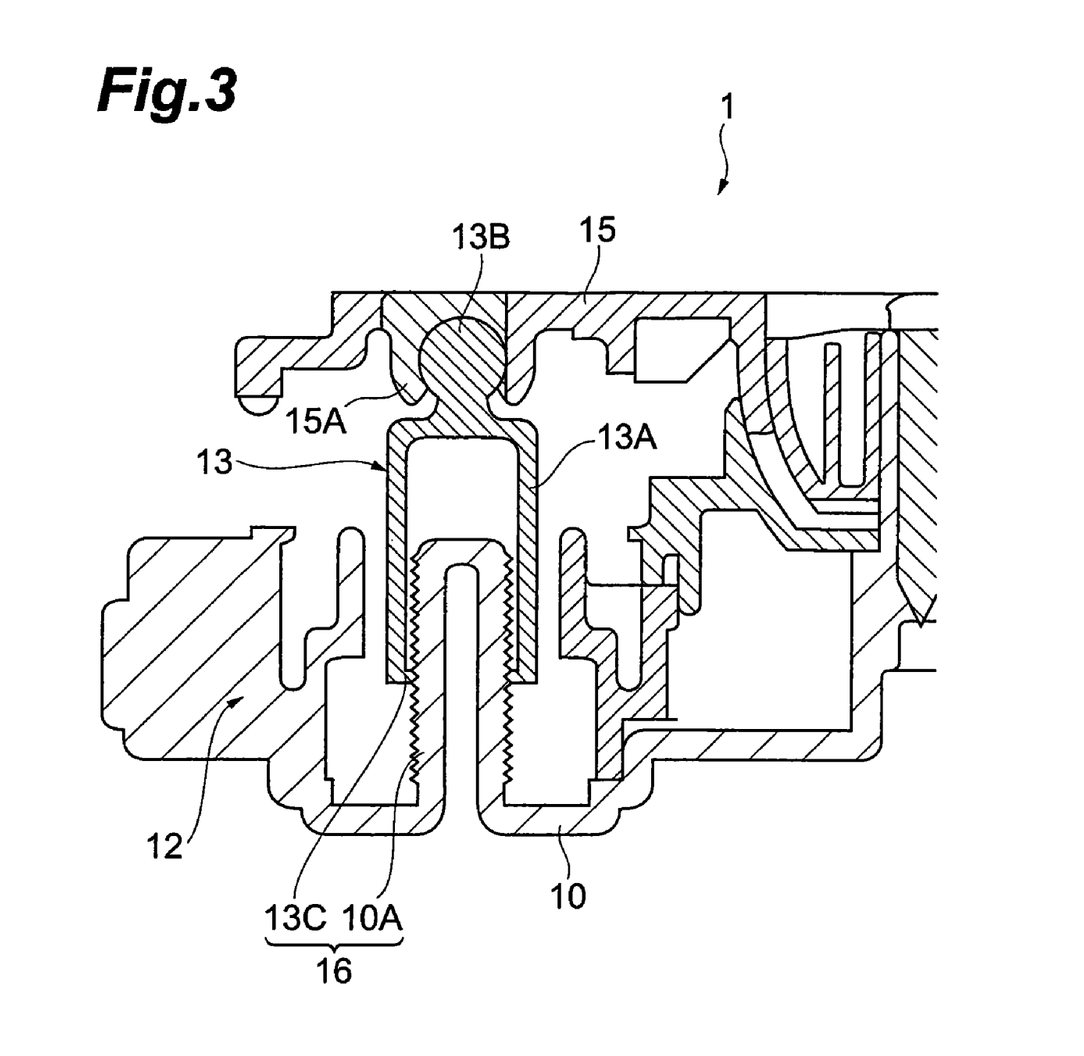
FIG. 3 is a sectional view of an essential part of the swinging mechanism body.

A preferred embodiment of the present invention will be described below referring to the drawings. FIG. 1 is an exploded perspective view of an electric mirror used in the preferred embodiment of the present invention, FIG. 2 is an exploded perspective view of a mirror holder and a swinging mechanism body, and FIG. 3 is a sectional view of an essential part of the swinging mechanism body. As shown in FIG. 1, a side mirror 1, which is an electric mirror, is provided with a cover 2 and a mirror main body 3, and the mirror main body 3 is contained within the cover 2. A frame 4 and a swinging mechanism body 5 are provided in the cover 2 on a back face side of the mirror main body 3. The swinging mechanism body 5 is mounted on the cover 2 through the frame 4, and the mirror main body 3 is mounted on the surface of the swinging mechanism body 5. The frame 4 and the swinging mechanism body 5 are arranged on the back face side of the mirror main body 3 and contained in the cover 2.

The swinging mechanism body 5 has a mirror body 10 as shown in FIG. 2, and a motor 11, which is an actuator, is provided at the mirror body 10. Moreover, a worm wheel 12 is connected to the motor 11, and an adjust nut 13 is mounted on the worm wheel 12. The adjust nut 13 has a cylindrical body portion 13A and a spherical head portion 13B. Moreover, the body portion 13A has a hollow inside thereof as shown in FIG. 3, and a claw portion 13C having elasticity is provided at its base end side. Furthermore, a male thread member 10A is provided at the mirror body 10, and this male thread member 10A is inserted into the body portion 13A of the adjust nut 13. Also, the claw portion 13C in the adjust nut 13 is engaged with the threaded portion in the male thread member 10A. Moreover, a base member 14 is fixed to the mirror body 10, and a through hole 14A is formed in the base member 14. The adjust nut 13 passes the through hole 14A and projects in the opposite direction of the mirror body 10 sandwiching the base member 14 therebetween.

Also, at a position in the mirror body 10 sandwiching the base member 14 therebetween, a pivot plate 15 is disposed. The pivot plate 15 has a hollowed fitting portion 15A having a spherical inner surface, as shown in FIG. 3, and the tip end of the adjust nut 13 is fitted in this fitting portion 15A. Moreover, to this pivot plate 15, the mirror main body 3 shown in FIG. 1 is fixed.

Then, when the motor 11 is operated, the worm wheel 12 and the adjust nut 13 mounted on this worm wheel 12 are rotated according to the operating state of the motor 11. When the adjust nut 13 is rotated, the adjust nut 13 is relatively moved close to/separated from with respect to the cover 2, and the pivot plate 15 in which the adjust nut 13 is fitted is relatively moved close to/separated from the cover 2. Thus a mirror surface angle of the mirror main body 3 is adjusted. Also, if the mirror surface angle of the mirror main body 3 exceeds an allowable range, movement of the mirror main body 13 is suppressed. At this time, the worm wheel 12 and the adjust nut 13 continue to be rotated, but the claw portion 13C provided at the adjust nut 13 is bent and goes over the thread on the male thread member 10A provided on the mirror main body 10, and the adjust nut 13 idles. When the bent claw portion 13C goes over the thread, a clutch noise is generated. The male thread member 10A and the claw portion 13C constitute a clutch mechanism 16.

Figure 4:
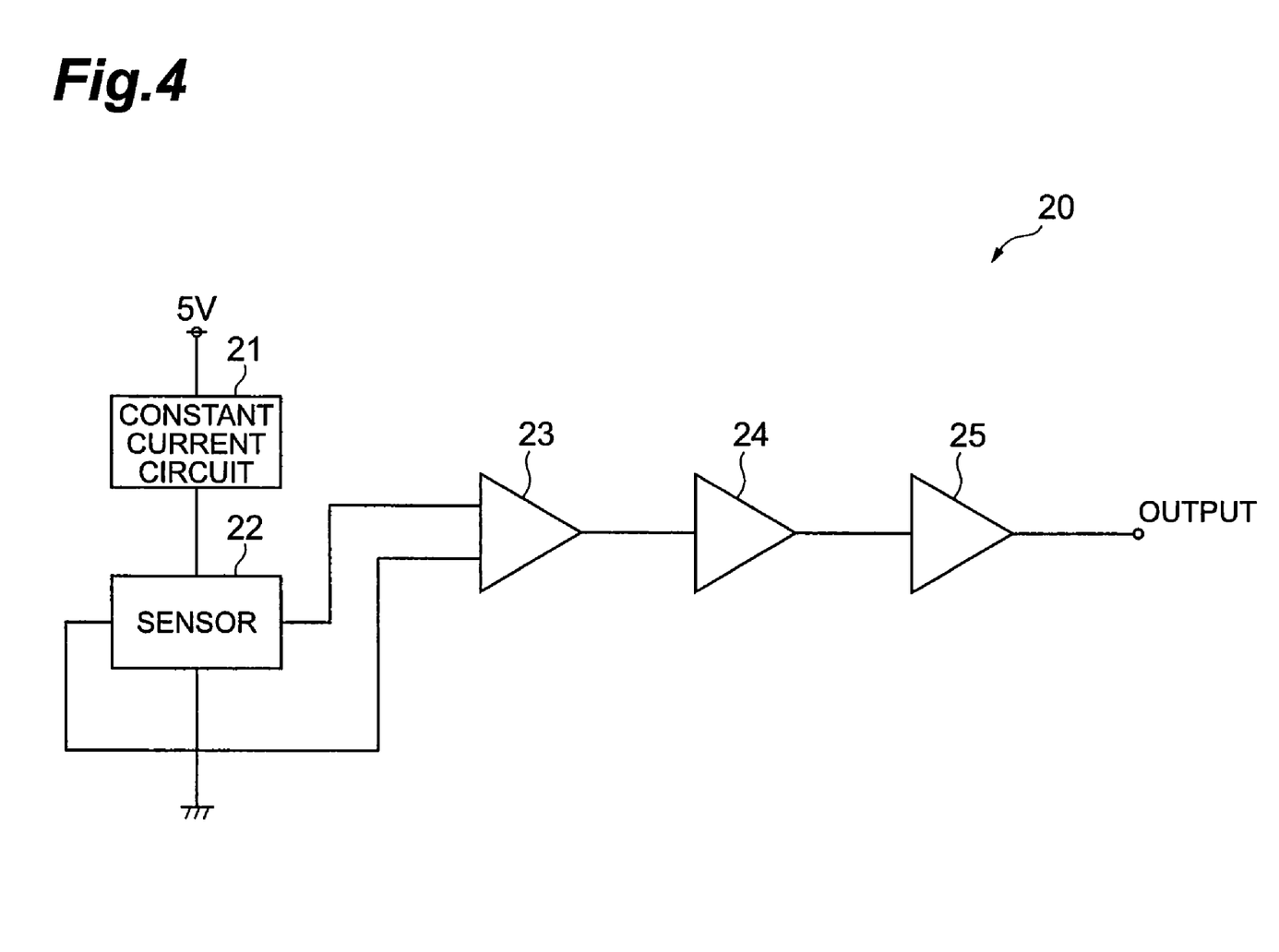
FIG. 4 is a circuit diagram of a mirror-surface angle detection circuit.

Moreover, on the side mirror 1, a mirror surface angle detection circuit for detecting a swing angle (mirror surface angle) of the mirror main body 3 with respect to the cover 2 is provided. FIG. 4 shows a circuit diagram of the mirror surface angle detection circuit. The circuit diagram in FIG. 4 shows a circuit for detecting a horizontal angle (angle around the vertical axis) for the mirror surface angle of the mirror main body 3, but a circuit for detecting a vertical angle (angle around the horizontal axis) is also provided as a similar circuit.

As shown in FIG. 4, a mirror surface angle detection circuit 20 is provided with a constant current circuit 21, a voltage sensor 22, an amplifier circuit 23, an offset circuit 24 and a clamp circuit 25. The constant current circuit 21 supplies a constant current to the voltage sensor 22. The voltage sensor 22 has a permanent magnet and a magnetic detection element for detecting a voltage generated from a relative positional change between the permanent magnet and the magnetic detection element with respect to the constant current supplied from the constant current circuit 21. Therefore, the voltage detected by the voltage sensor 22 varies according to the mirror surface angle.

Figure 5:
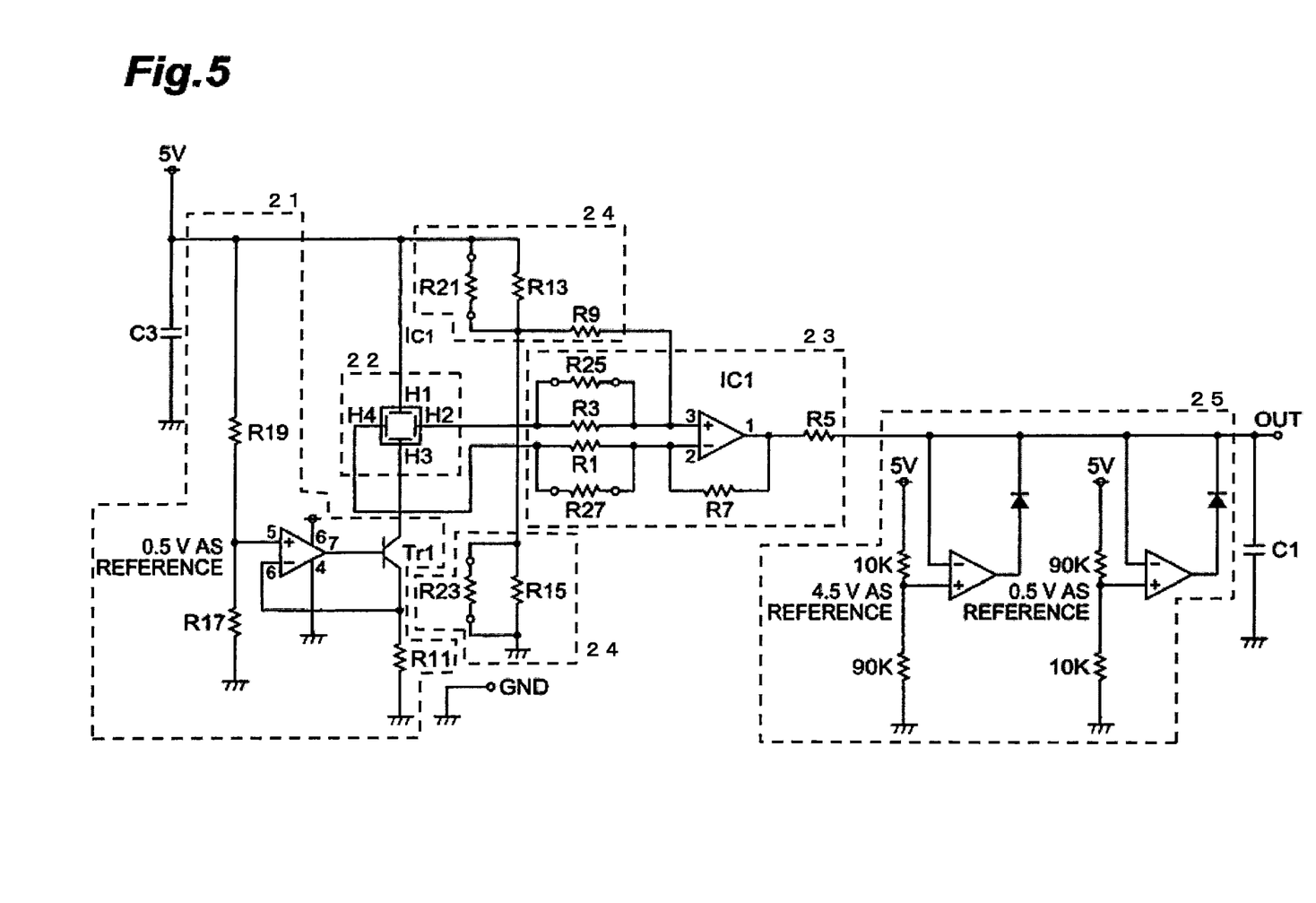
FIG. 5 is a circuit diagram of the mirror-surface angle detection circuit as a specific example.

The amplifier circuit 23 amplifies the voltage detected by the voltage sensor 22. The voltage value amplified by the amplifier circuit 23 is outputted to the offset circuit 24. The offset circuit 24 offsets the voltage value amplified by the amplifier circuit 23 and adjusts it to a predetermined voltage value. The voltage value offset by the offset circuit 24 is outputted to the clamp circuit 25. In the clamp circuit 25, the outputted voltage value is clamped to predetermined upper limit value and a predetermined lower limit value, which are 4.5V and 0.5V in the embodiment respectively. Here, in the embodiment, the time when the voltage value becomes 5V and 0V is defined as a state where the mirror surface angle reaches the limit value, respectively. An alternative to the mirror surface angle detection circuit 20 shown in FIG. 4 is a circuit as shown in FIG. 5, for a specific example.

Figure 6:
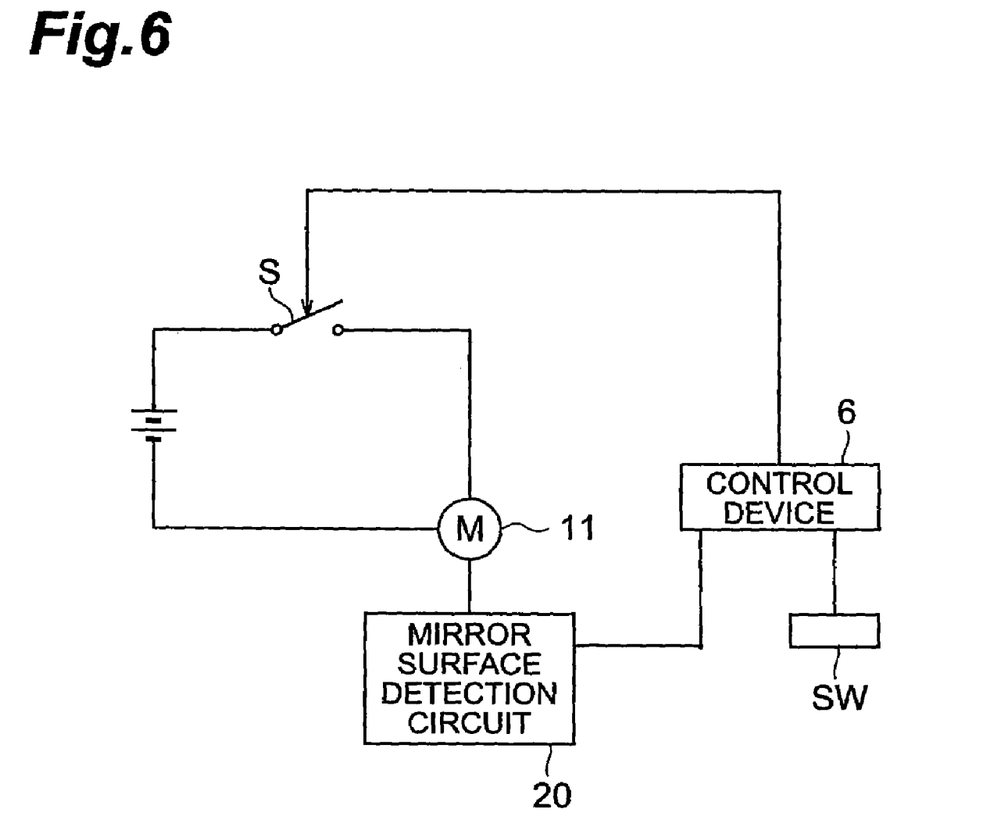
FIG. 6 is a circuit diagram of the electric mirror.

Furthermore, as shown in FIG. 6, a control device 6 is connected to the mirror surface angle detection circuit 20, and the motor 11 is connected to the control device 6. The control device 6 performs opening/closing control of a switch element S by operating a mirror operating switch SW provided at a driver's seat of an automobile, which is not shown. By this opening/closing control, an electric current is supplied to the motor 11, and by operating the motor 11, the mirror surface angle of the mirror main body 3 is adjusted.

Figure 7A:
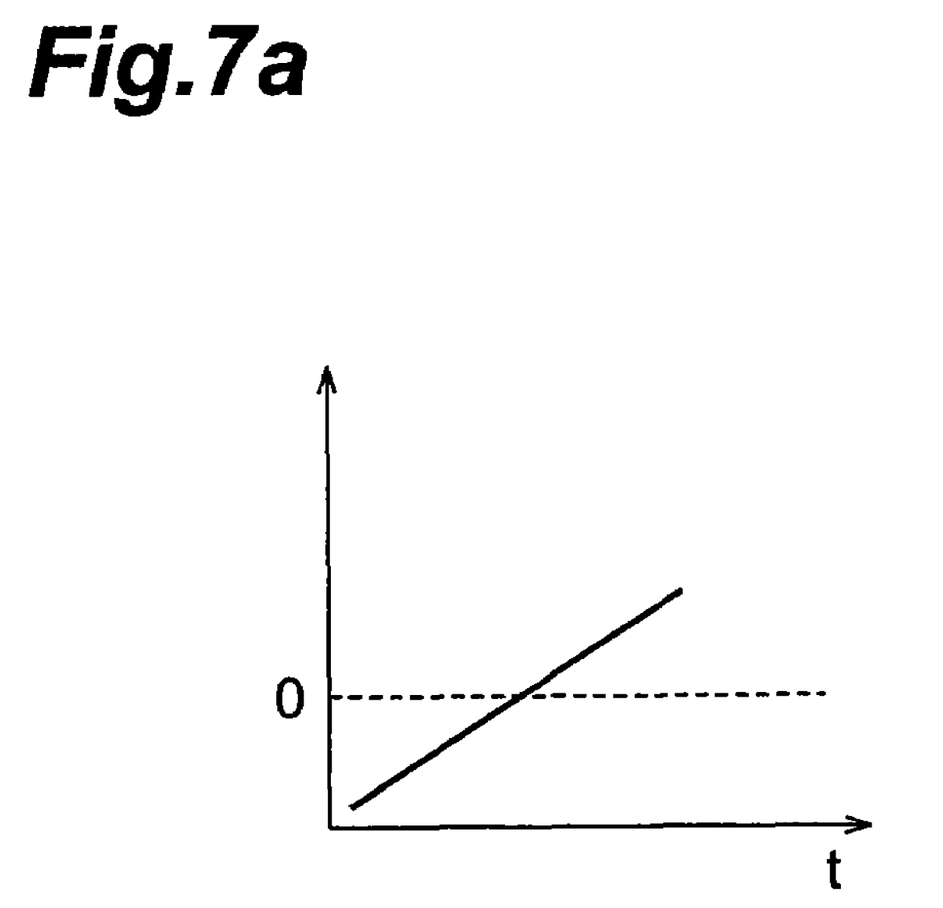
FIG. 7a is a graph showing a waveform of a voltage value outputted from an amplifier circuit.
Figure 7B:
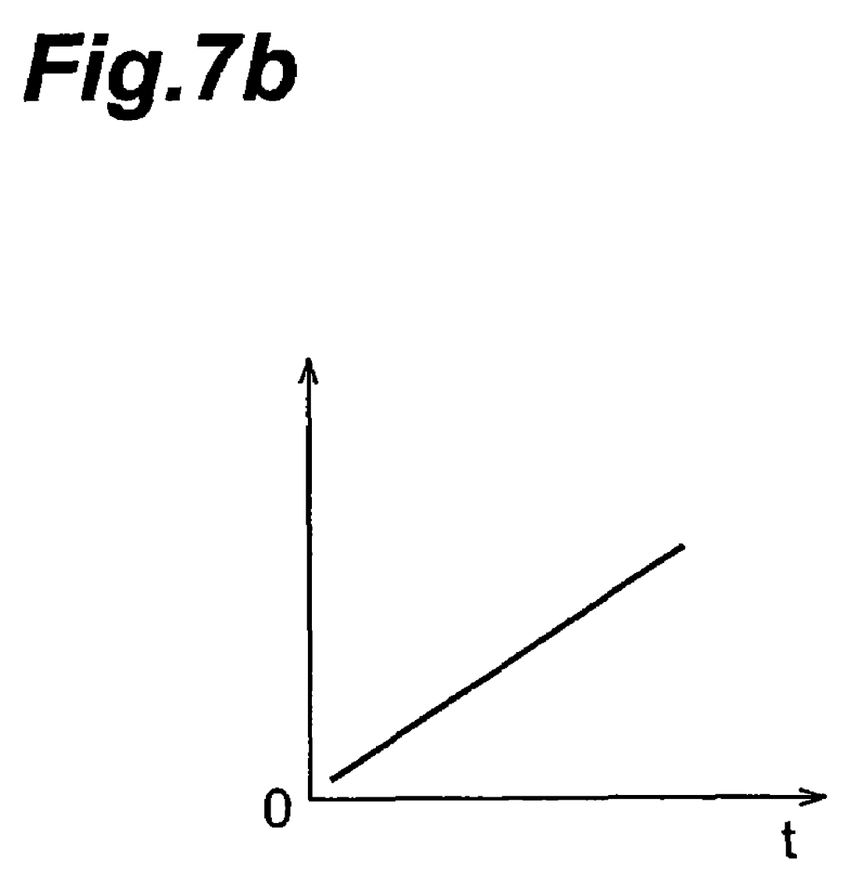
FIG. 7b is a graph showing a waveform of a voltage value outputted from an offset circuit.
Figure 7C:
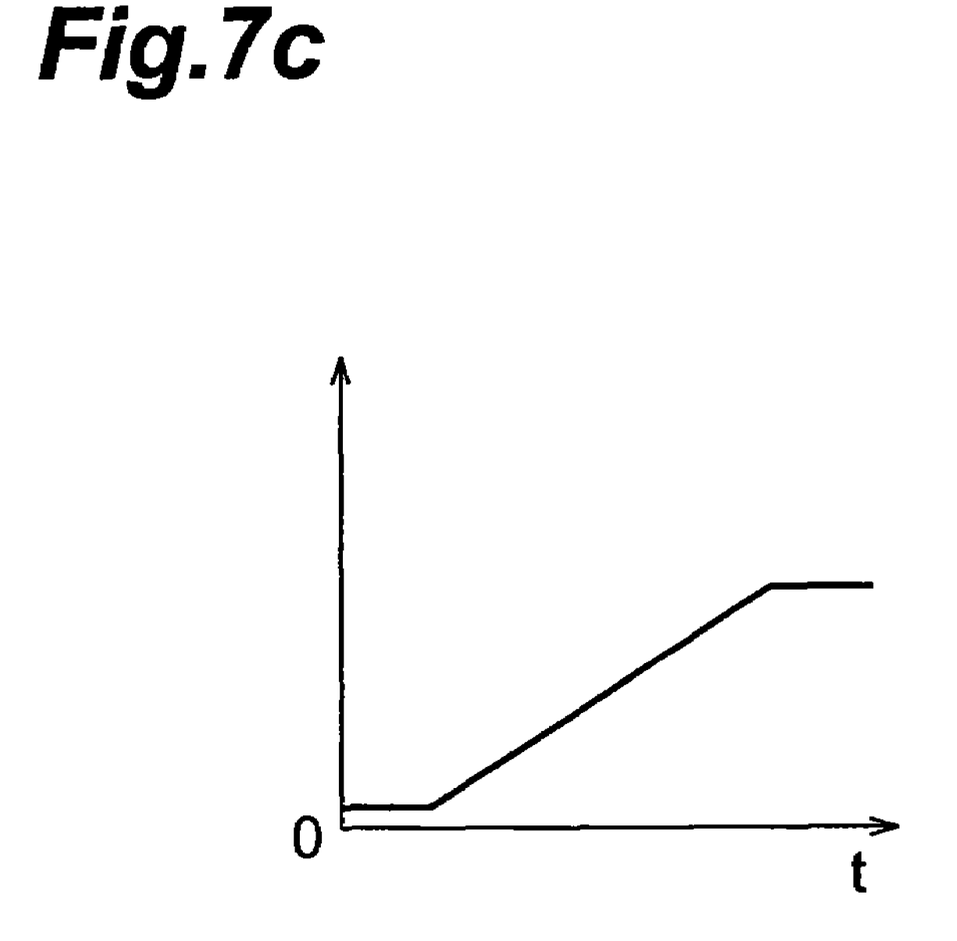
FIG. 7c is a graph showing a waveform of a voltage value outputted from a clamp circuit.

Next, an operation of the electric mirror control device according to the embodiment will be described. In the electric mirror control device according to the embodiment, a voltage detected by the voltage sensor 22 changes depending on the mirror surface angle of the mirror, and the motor 11 is controlled by this change of the voltage so as to suppress movement of the mirror main body 3 exceeding an allowable range. Here, in the mirror surface angle detection circuit 20, the voltage detected by the voltage sensor 22 is amplified by the amplifier circuit 23, and the voltage value is adjusted by the offset circuit 24 and thereafter, the voltage value is clamped to a maximum value and a minimum value set as limit values at the clamp circuit 25. For example, if the mirror main body 3 is moved in a certain direction by operating the motor 11, when the voltage detected by the voltage sensor 22 is outputted to the amplifier circuit 23, a change in the voltage value outputted from the amplifier circuit 23 draws, as shown in FIG. 7a, a waveform increasing in proportion to the operating angle of the mirror surface angle of the mirror main body 3. When this voltage is outputted to the offset circuit 24, the change in the voltage value outputted from the offset circuit 24 is, as shown in FIG. 7b, located at a position where the voltage value is offset. When this voltage is outputted to the clamp circuit 25, the change in the voltage value outputted from the clamp circuit 25 forms, as shown in FIG. 7c, a waveform clamped to 4.5V, which is an upper limit value of the voltage value, and 0.5V, which is a lower limit value.

Figure 8:
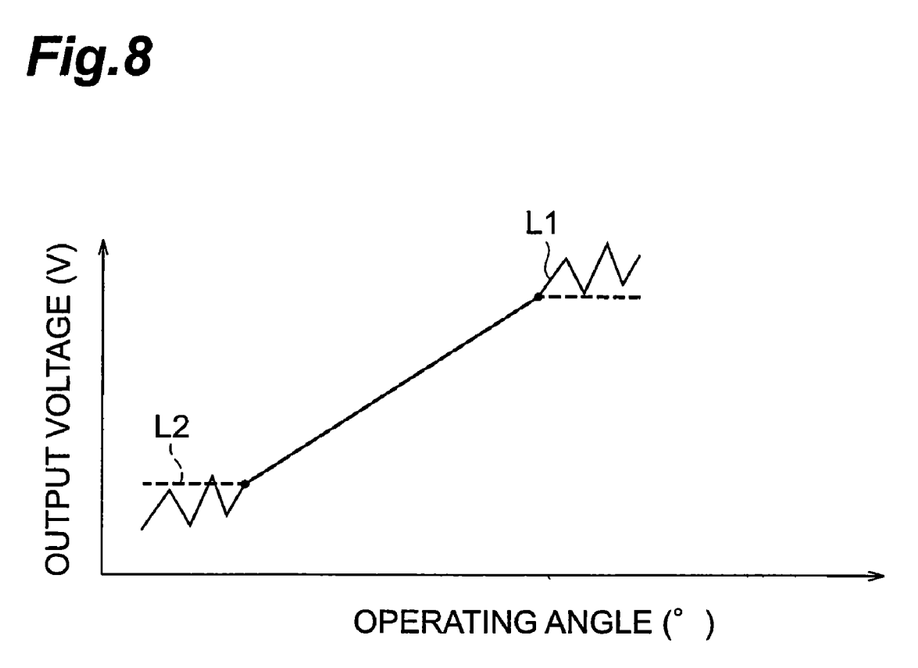
FIG. 8 is a graph showing a change in the voltage value.

On the one hand, when tilting the mirror main body 3 by driving the motor 11, if the motor 11 tries to operate exceeding the allowable range of the mirror main body 3, the motor 11 idles by the clutch mechanism 16. At this time, the voltage detected by the voltage sensor 22 is in the largely oscillated state at the time when the allowable range is exceeded as shown by a straight line L1 in FIG. 8 before outputted by the clamp circuit 25. When this largely oscillated voltage is detected by the voltage sensor 22, it can be determined that the allowable range has been exceeded, but in this case, the accuracy to determine exceeding of the allowable range is low.

On the other hand, in the electric mirror control device in this preferred embodiment, the clamp circuit 25 is provided in the mirror surface angle detection circuit 20. This clamp circuit 25 clamps the detected voltage value to the upper limit value and the lower limit value, which are predetermined limit values, respectively. Therefore, it is detected by the voltage sensor 22, and the voltage value outputted from the clamp circuit 25 is, as shown by a straight line L2 in FIG. 8, clamped at a position closest to the allowable range. The control device 6 determines if this clamped voltage value continues for a certain period of time or not, and when it is determined that the clamped voltage value has continued for the certain period of time, the switch element S is controlled to be open. Therefore, the motor M can be stopped at a position closest to the allowable range. Thus, without narrowing the allowable range of the tilting angle of the mirror surface, accurate detection can be made, and slipping of the clutch disposed in the actuator is stopped as quickly as possible, consequently generation of the clutch noise can be prevented.

Figure 9:
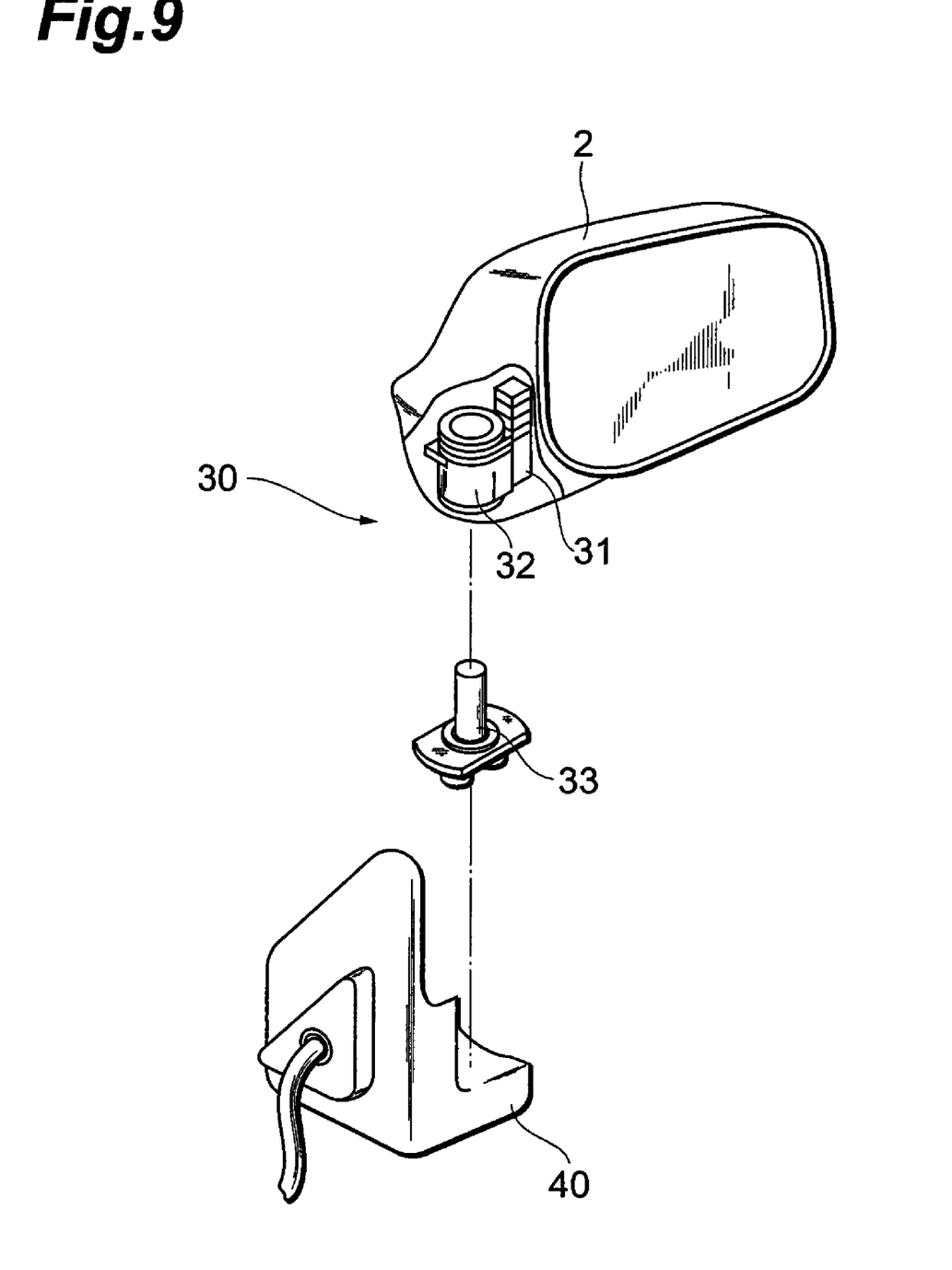
FIG. 9 is an exploded perspective view of an electric storage portion in an automobile electric mirror.

In the above embodiment, an example of mirror surface angle adjustment was described for control of an automobile electric mirror, but the similar control can be also performed for control of electric storage. FIG. 9 is an exploded perspective view of an electric storage portion in the automobile electric mirror. An electric storage portion 30 has a speed reducer 31 integrally incorporated in the cover 2, and a motor 32 is mounted to the speed reducer 31. An output shaft 33 is mounted to the speed reducer 31, and a lower end of the output shaft 33 is mounted to a base member 40. The base member 40 is fixed to a body of a vehicle, which is not shown. Also, as a position of the cover 2, a using position standing for the use state and a stored position standing for the fold state are specified, and by driving the motor 32, the using position and the stored position are switched. Moreover, the speed reducer 31 is provided with a clutch mechanism, not shown, and when the electric storage mirror is to rotate the cover 2 exceeding the using position or the stored position, the clutch mechanism slips so as to shut off a power from the motor 32.

As for the motor 32 in the electric storage portion 30 having the above arrangement as well, there is a problem of clutch noise generated while slipping of the clutch mechanism disposed in the speed reducer 31 as with the above motor 11 for adjusting the mirror surface angle. In order to cope with this, the generation of the clutch noise while slipping of the clutch mechanism can be prevented by performing the similar control as that of the control device 6.

The preferred embodiments of the present invention have been described so far but the present invention is not limited to the above embodiments. For example, in the above embodiment, the motor is used as the actuator, but other driving mechanisms may be used. Also, the motor is stopped to stop driving of the electric mirror, but such a mode may be adopted that the motor is disconnected from the clutch mechanism.

What is claimed is:

1. A mirror control device for controlling a mirror surface angle of a mirror mounted on an automobile, comprising:
   a sensor system configured to output a voltage corresponding to the surface angle of the mirror, the sensor system including:
      a sensor configured to detect a mirror surface angle information corresponding to the surface angle of the mirror and transform the mirror surface angle information into a voltage signal,
      an amplifying circuit and an offset circuit which amplify and offset the voltage signal, and
      a clamp circuit configured to receive the voltage signal after being amplified and offset, and to clamp the signal to a voltage that is clamped at a predetermined limit value; and
   a control device connected to the sensor system and configured to determine whether the predetermined limit value continues to be outputted from the sensor system for a predetermined period, and to stop changing the mirror surface angle when the predetermined limit value continues to be output from the sensor system for the predetermined period.

2. The mirror control device according to claim 1, wherein at least one of a predetermined upper limit value and a predetermined lower limit value is set as the predetermined limit value, and wherein
   the control device is configured to stop changing the mirror surface angle after the predetermined upper limit value or the predetermined lower limit value continues to be outputted from the sensor system for the predetermined period.

3. The mirror control device according to claim 1, further comprising:
an actuator configured to change the mirror surface angle and controlled by the control device.

4. The mirror control device according to claim 1, wherein:
the sensor is configured to output the voltage signal to the amplifier;
the amplifier is configured to amplify the voltage signal and output an amplified voltage signal to the offset circuit; and
the offset circuit is configured to offset the amplified voltage signal, and output the amplified and offset voltage signal as the voltage to the clamp circuit.

5. The mirror control device according to claim 1, wherein:
the sensor is configured to output the voltage signal to the offset circuit;
the offset circuit is configured to offset the voltage signal and output an offset voltage signal to the amplifier circuit; and
the amplifier circuit is configured to amplify the offset voltage signal, and output an offset and amplified voltage signal as the voltage to the clamp circuit.

6. A mirror system comprising:
a case;
a mirror main body mounted to the case;
an actuator configured to change a mirror surface angle of the mirror main body with respect to the case;
a sensor system configured to output a voltage corresponding to the surface angle of the mirror, the sensor system including:
a sensor configured to detect a mirror surface angle information corresponding to the surface angle of the mirror and transform the mirror surface angle information into a voltage signal,
an amplifying circuit and an offset circuit which amplify and offset the voltage signal, and
a clamp circuit configured to receive the voltage signal after being amplified and offset, and to clamp the signal to a voltage that is clamped at a predetermined limit value; and
a control device connected to the sensor system and configured to determine whether the predetermined limit value continues to be outputted from the sensor system for a predetermined period, and stop changing the mirror surface angle when the predetermined limit value continues to be outputted from the sensor system for the predetermined period.

7. The mirror system according to claim 6, wherein at least one of a predetermined upper limit value and a predetermined lower limit value is set as the predetermined limit value, and the control device is configured to stop changing the mirror surface angle after the predetermined upper limit value or the predetermined lower limit value continues to be outputted from the sensor system for the predetermined period.

8. The mirror system according to claim 6, further comprising:
a clutch provided between the actuator and the mirror main body, and configured to slip to prevent the mirror main body from moving beyond a predetermined range.

9. The mirror system according to claim 6, wherein:
the sensor is configured to output the voltage signal to the amplifier;
the amplifier is configured to amplify the voltage signal and output an amplified voltage signal to the offset circuit; and
the offset circuit configured to offset the amplified voltage signal, and output the amplified and offset voltage signal as the voltage to the clamp circuit.

10. The mirror system according to claim 6, wherein:
the sensor is configured to output voltage signal to the offset circuit;
the offset circuit is configured to receive the voltage signal, offset the voltage signal and output an offset voltage signal to the amplifier circuit; and
the amplifier circuit is configured to amplify the offset voltage signal, and output an offset and amplified offset voltage signal as the voltage to the clamp circuit.

11. A mirror surface angle control method comprising:
detecting a surface angle of a mirror;
generating a voltage corresponding to the surface angle of the mirror by:
detecting a mirror surface angle information corresponding to the surface angle of the mirror;
transforming the mirror surface angle information into a voltage signal;
amplifying the voltage signal;
offsetting the voltage signal;
outputting an amplified and offset voltage signal,
clamping the amplified and offset voltage signal at a predetermined limit value;
determining whether the predetermined limit value continues to be outputted for a predetermined period; and
stopping changing the mirror surface angle when the voltage continues clamped at the predetermined limit value for a predetermined period.

12. The mirror surface angle control method according to claim 11, wherein at least one of a predetermined upper limit value and a predetermined lower limit value is set as the predetermined limit value, and
changing the mirror surface angle is stopped after the predetermined upper limit value or the predetermined lower limit value continues to be outputted for the predetermined period.

13. The mirror surface angle control method according to claim 11, further comprising:
detecting a mirror surface angle information corresponding to the surface angle of the mirror;
transforming the mirror surface angle information into a voltage signal;
amplifying the voltage signal to provide an amplified voltage signal;
offsetting the amplified voltage signal to provide an amplified and offset voltage signal;
outputting the amplified and offset voltage signal as the voltage.

14. The mirror surface angle control method according to claim 11, further comprising:
detecting a mirror surface angle information corresponding to the surface angle of the mirror;
transforming the mirror surface angle information into a voltage signal;
offsetting the voltage signal to provide an offset voltage signal;
amplifying the offset voltage signal to provide an offset and amplified voltage signal; and
outputting the offset and amplified voltage signal as the voltage.

* * * * *